Aug. 7, 1923.

E. G. STRONG

TOOL HOLDER

Filed June 22, 1921.

1,464,344

Inventor
E. G. Strong his Attorneys.

Patented Aug. 7, 1923.

1,464,344

UNITED STATES PATENT OFFICE.

ERNEST G. STRONG, OF CANTON, OHIO, ASSIGNOR TO THE TIMKEN ROLLER BEARING COMPANY, A CORPORATION OF OHIO.

TOOL HOLDER.

Application filed June 22, 1921. Serial No. 479,680.

*To all whom it may concern:*

Be it known that I, ERNEST G. STRONG, a citizen of the United States, and a resident of the city of Canton, in the county of Stark and State of Ohio, have invented a new and useful Improvement in Tool Holders, of which the following is a specification.

My invention relates to tool holders and has for its principal objects to devise an attachment for lathes and the like comprising a support for holding a tool for dressing or truing grinding wheels that will permit easy and accurate positioning of the dressing tool, that can be located on a lathe or the like so as to be easily available for use and so as not to interfere with the ordinary use of the lathe. The invention consists partly in providing easily operable means for varying the angle at which the dressing tool is presented to the work. The invention further consists in the parts and combinations of parts hereinafter described and claimed.

In the drawings which form part of this specification and wherein like reference numerals represent like parts wherever they occur, Fig. 1 is a plan view of a tool holder embodying my invention and of a portion of a lathe on which the same is mounted;

Figure 1:
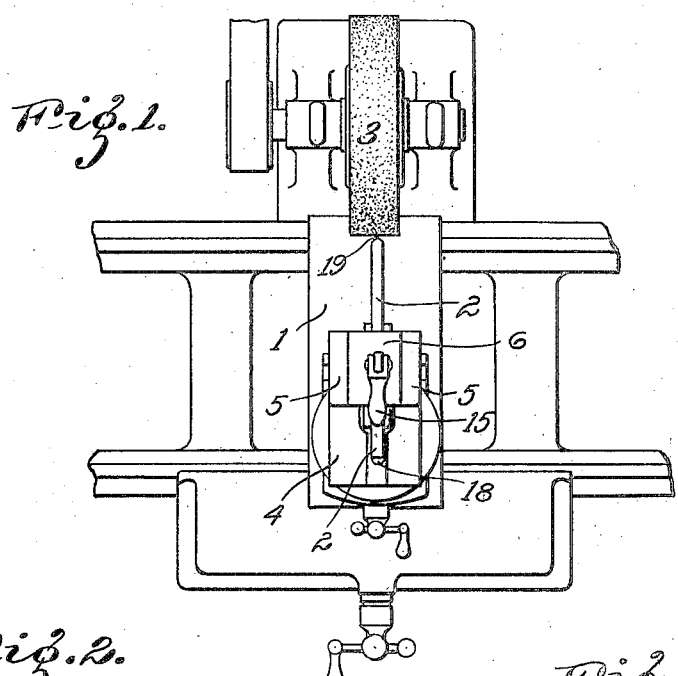
Figures 2, 3:
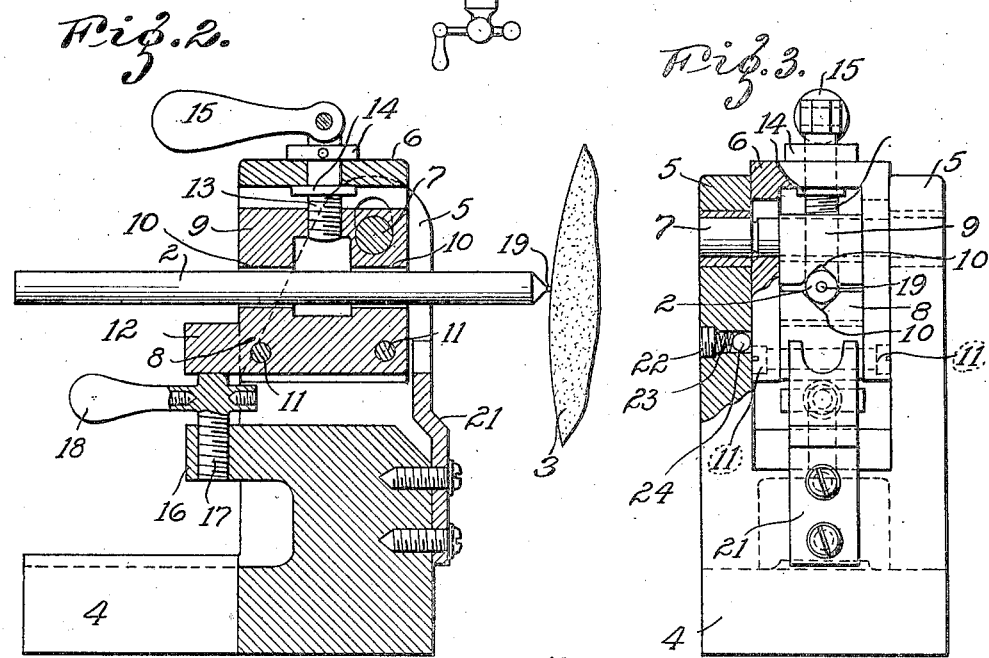
Fig. 2 is a vertical sectional view of said tool holder.
Fig. 3 is an end elevation thereof.
Figures 4, 5:
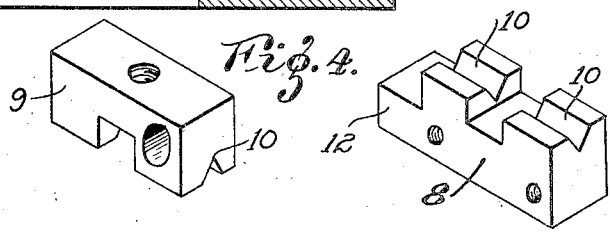
Fig. 4 is a perspective view of one of the clamp blocks forming part of the tool holder.
Fig. 5 is a perspective view of the other of said clamp blocks.

Mounted on a reciprocatable member 1 of a lathe or the like is a support for a tool 2 for dressing or truing the grinding wheel 3 of said lathe. The base 4 of said support is provided with spaced arms 5 between which a hanger or yoke 6 for the dressing tool 2 is pivotally mounted on a pin 7 that passes longitudinally through holes provided therefor in the arms 5 of the support and in the arms of the yoke or hanger 6.

Rigidly secured between the hanger arms are a lower clamp block 8 and an upper clamp block 9. Said clamp blocks have alining V-shaped grooves 10 therein in which the body portion of the dressing tool 2 is disposed. Thus the dressing tool is clamped between said blocks. Said dressing tool preferably has a diamond secured in its end.

The lower clamp block 8 is rigidly secured to the hanger 6, as by screws 11 and has a portion 12 projecting beyond the hanger arms. The upper clamp block 9 has a threaded hole in the top thereof in which is disposed the threaded end of a screw 13, whose upper end is unthreaded and extends through a hole provided therefor in the hanger 6. Collars 14 on the screw 13 above and below the hanger 6 hold said screw against endwise movement in said hanger. A handle 15 or other means is provided for turning said screw 13. The hanger pivot pin 7 extends through a hole in the upper clamp block 9 and fits tightly therein, and thus the upper clamp block is held against vertical movement. The lower clamp block 8 is rigidly secured to the hanger, and the holes in the hanger that accommodate said pivot pin 7 are elongated vertically. Thus, the upper clamp block 9 constitutes a reaction member for the screw band turning the screw in one direction moves the hanger 6 and the lower clamp block 8 therein upwardly, firmly clamping the tool 2 between the clamp blocks. Turning the screw in the other direction permits the hanger 6 and the lower clamp block 8 to lower slightly, thus releasing the tool 2.

In a threaded hole in a projecting ledge 16 on the base is mounted an adjusting screw 17 upon whose upper end rests the projecting portion 12 of the lower clamp block 8. Said screw 17 is provided a suitable handle 18 for turning it. The screw is offset from the vertical plane of the pivot of the hanger and therefore turning the screw causes the hanger 6 and the dressing tool 2 therein to swing about the pivot. When the dressing tool 2 is in position to be used, it projects outwardly from its support in a substantially horizontal direction and the diamond 19 that constitutes the working portion of said tool is a little above (or below) the horizontal plane of the center of the grinding wheel 30. Thus swinging the dressing tool 12 about its pivot causes the diamond to approach or withdraw from the work and its position with reference to the work may be easily and accurately adjusted.

When the dressing tool 2 is not in use, the hanger may be swung about its pivot by grasping the end of said tool so that the dressing tool extends downwardly and will clear all parts of the lathe when the member 1 on which it is mounted is moving back and forth. A metal strip 21 secured to the base and extending into the opening between the arms of said base, constitutes a stop which limits the movement of the dressing tool 2 and prevents it from being swung so far that the diamond will strike the base 4. In one of the hanger arms is a hole in which are mounted a short screw 22, a spring 23 and a metal ball 24. The ball is pressed by said spring to engage one of the hanger arms and by its frictional engagement with said arm tends to prevent accidental movement of the hanger.

The above described dressing tool support provides a simple and accurate adjustment for dressing tools. The pivoting of the dressing tool hanger presents the diamond to the work at different angles and thus lengthens the life of the diamond which, if it is always presented to the work at the same angle, becomes blunted and unfit for use. The dressing tool is easily brought into position and is easily put out of the way.

It is obvious that numerous changes may be made without departing from my invention and I do not wish to be limited to the precise construction shown.

What I claim is:

1. A lathe attachment for dressing grinding wheels comprising a pivotally mounted hanger for the dressing tool, and means for adjusting the angular position of said hanger, said hanger being free to be manually tilted to clear the frame of the lathe independently of said adjusting means.

2. A lathe attachment comprising a tool, a pivotally mounted hanger for the tool, manually operable means for adjusting the angular position of said hanger, said means comprising a screw threaded into said base and bearing at its end against a portion projecting from said hanger whereby said hanger is free to be manually tilted to clear the frame of the lathe independently of said adjusting means.

3. A lathe attachment for dressing grinding wheels, comprising a base adapted to be slidably mounted on the lathe frame and having spaced uprights, an inverted yoke pivotally mounted in said uprights on a horizontal axis, a dressing tool mounted to move with said yoke, and means for adjusting the angular position of said yoke, said means comprising a manually operable screw threaded into the base and bearing at its end against a portion projecting from the yoke, whereby said yoke is free to be manually tilted independently of said adjusting means.

4. The combination with a lathe of an attachment for dressing grinding wheels, said attachment comprising a base slidably mounted on the lathe frame and having spaced uprights, a yoke pivotally mounted in said uprights on a horizontal axis, a dressing tool mounted to move with said yoke and means for adjusting the angular position of said yoke, said yoke being free to be manually tilted independently of said adjusting means.

5. The combination with a lathe of an attachment for dressing grinding wheels, said attachment comprising a base slidably mounted on the lathe frame and having spaced uprights, a yoke pivotally mounted in said uprights on a horizontal axis, a dressing tool mounted to move with said yoke and means for adjusting the angular position of said yoke, said means comprising a screw threaded into said base and bearing at its end against a portion projecting from said yoke, whereby said yoke is free to be manually tilted independently of said adjusting means.

6. The combination with a lathe of an attachment for dressing grinding wheels, said attachment comprising a base slidably mounted on the lathe frame and having spaced uprights, a yoke pivotally mounted in said uprights on a horizontal axis, a dressing tool mounted to move with said yoke, means for adjusting the angular position of said yoke and a frictional contact member mounted in one of said uprights and bearing against said yoke.

7. A lathe attachment for dressing grinding wheels, comprising a base having spaced uprights, a yoke pivotally mounted in said uprights on a horizontal axis, clamp blocks mounted in said yoke, a dressing tool secured between said clamp blocks to move with said yoke, and means for adjusting the angular position of said yoke, said means comprising a screw threaded into the base and bearing against a portion projecting from said yoke.

8. A lathe attachment for dressing grinding wheels, comprising a base having spaced uprights, a yoke pivotally mounted in said uprights on a horizontal axis, clamp blocks mounted in said yoke, a dressing tool secured between said clamp blocks to move with said yoke, means for adjusting the angular position of said yoke, said means comprising a screw threaded into the base and bearing against a portion projecting from said yoke and means for limiting the movement of said yoke.

9. In a device of the kind described, a base having spaced uprights, a yoke disposed between said uprights, a pin horizontally mounted in said uprights and passing through vertically elongated holes in the arms of said yoke, whereby said yoke is pivotally mounted and is capable of limited vertical movement, a lower clamp block secured in said yoke, an upper clamp block disposed in said yoke, and mounted on said horizontal pin, a screw threaded into said upper clamp block and having an end unthreaded and passing through a hole in said yoke, collars on said screw above and below said yoke to prevent endwise movement of the screw, a dressing tool held between said clamp blocks, and means for adjusting the angular position of said yoke.

10. In a device of the kind described, a base having spaced uprights, a yoke disposed between said uprights, a pin horizontally mounted in said uprights and passing through vertically elongated holes in the arms of said yoke, whereby said yoke is pivotally mounted and is capable of limited vertical movement, a lower clamp block secured in said yoke, an upper clamp block disposed in said yoke, and mounted on said horizontal pin, a screw threaded into said upper clamp block and having an end unthreaded and passing through a hole in said yoke, collars on said screw above and below said yoke to prevent endwise movement of the screw, a dressing tool held between said clamp blocks, and means for adjusting the angular position of said yoke, said means comprising a screw threaded into said base and bearing against a portion projecting from said yoke.

Signed at Canton, Ohio, this 17th day of June, 1921.

ERNEST G. STRONG.